Patented Sept. 11, 1951

2,567,238

UNITED STATES PATENT OFFICE 2,567,238

DICYANDIAMIDE AND FORMALDEHYDE PRODUCT AND METHOD OF MAKING

Lucien Sellet, Saddle River, and William O. Dawson, East Paterson, N. J., assignors to Jacques Wolf & Co., a corporation of New Jersey No Drawing. Application July 9, 1949,
Serial No. 103,953

5 Claims. (Cl. 260—69)

This invention relates to a water soluble resinous material and the method of making it. The invention relates, more particularly, to a condensation product of dicyandiamide and formaldehyde that, as made, passes from the original A-stage or water soluble mixture of reactants to an intermediate water insoluble or B-stage resin and then to the water soluble C-stage resin. The C-stage material may be reconverted to insoluble form after application to textiles, paper, leather or the like and may be used in treating such products.

Melamine and to a lesser extent guanidine condensation products with formaldehyde have been used heretofore. Dicyandiamide condensation products with formaldehyde, on the other hand, have not been used to any substantial extent, in spite of the fact that dicyandiamide is less expensive than these other amino compounds. Dicyandiamide is necessarily less costly than melamine and guanidine since melamine and guanidine are made by the use of dicyandiamide as the raw material.

There is a reason for the lack of use heretofore of the dicyandiamide and aldehyde resins. The teaching of the literature and the understanding in the art are to the effect that dicyandiamide is equivalent to the other amino compounds heretofore used. Thus it has been understood that the dicyandiamide acts in the same manner as melamine or urea in condensation with formaldehyde. This, we have found, is not the case. Melamine and formaldehyde, for instance, condense to give products which, as the condensation proceeds, become less and less tolerant of water; dicyandiamide and formaldehyde give initially a water soluble product which, on further heating, goes to a water insoluble polymer. We have discovered that this insoluble material becomes soluble again when the condensation is continued under carefully established conditions.

Our product is this material that is stable in dry form, that in manufacture has passed through the insoluble to soluble state, and that is readily reconverted to insoluble form (D-stage) at the time of ultimate use.

The invention comprises the method of, and the product resulting from, warming dicyandiamide with formaldehyde in the proportion of 3.6 to 5 mols for each mol of the dicyandiamide at a pH above 7, continuing the warming until the initially formed water insoluble material becomes once more soluble in water, and then cooling or promptly drying the product. Water solubility is determined by diluting a sample of the product with 10 to 20 volumes of cold water; material that is water soluble does not precipitate on such extreme, practically infinite dilution.

In one embodiment, the invention comprises the impregnation or coating of various commercial materials with the water soluble product made as described and then curing the applied material to an insoluble or D-stage as described later herein.

The general method of preparing our new product is essentially as follows: dicyandiamide and formaldehyde in aqueous solution and in the critical proportion are mixed in a suitable container. The mixture is heated at a pH above 7, suitably under a reflux condenser at approximately the boiling point of the mixture. The heating is continued until specimens of the material removed from time to time and tested show that the product of the reaction has passed through the intermediate insoluble B-stage and on to the C-stage in which it is soluble in water at very high dilution.

When the proportion of formaldehyde is substantially above 5 mols, then the necessary intermediate water insoluble high polymer is not obtained; the insoluble condition does not appear at any time during the reaction. When the proportion of formaldehyde is substantially below 3.6, the insoluble B-stage resin on further refluxing gels or resinifies before reaching the water soluble C-stage.

When the molar proportion used is 3.6–5 of formaldehyde to 1 of dicyandiamide and when the reaction has been carried to the C-stage, then the product is stabilized or fixed by cooling and removal of water, as, for instance, by cooling and then spray drying. In this spray drying, the cooled material is passed continuously through a preheater and then promptly sprayed into a stream of heated air in accordance with usual practice in spray drying.

As to kinds of material used, we know of no substitute for dicyandiamide that, with formaldehyde, will give the results described herein.

As the aldehyde, we use formaldehyde such as the aqueous solution sold commercially as formalin. We have found on advantage in diluting the commercial formalin containing about 37 to 38% of actual formaldehyde, using paraformaldehyde, or substituting formaldehyde by acetaldehyde, pyruvic aldehyde, or any other water soluble aldehyde.

To establish the pH we use any water soluble alkali commonly used in establishing pH levels. Examples are borax, sodium carbonate, tertiary sodium phosphate, or dilute aqueous solution of sodium hydroxide. The condensation may be started in neutral or slightly acidic condition, but the condensation mixture must be of pH above 7 before the B (insoluble) stage is reached and remain above 7 into the C (soluble) stage.

The temperature at which the condensation is effected must be at least that elevated temperature at which dicyandiamide in the proportion used dissolves in the aqueous solution of formaldehyde. This is a temperature of about 55° to 65° C. The maximum temperature of reaction is not above the boiling point of the mixture under the pressure used. At atmospheric pressure, the temperature does not rise much above 95° C. and we have found that to be a very satisfactory temperature for effecting the condensation. Between 55° and 95° C., the condensation proceeds to the C-stage but the rate is very slow. If an autoclave is available, somewhat higher temperatures than 95° C. may be used, as, for instance, temperatures up to about 120° to 140° C.

As to time of reaction, the time required to produce a water soluble C stage material will vary according to the temperature at which the mixture is heated. The higher the temperature, other conditions being equal, the shorter is the time necessary to reach the desired water soluble C-stage. At temperatures of 95° C. we have found this to be ordinarily within the range of about 1½ to 5 hours.

The invention will be illustrated in greater detail by the following specific examples of the practice of it.

Example 1

A three-neck flask equipped with condenser, thermometer, agitator, and reflux condenser was charged with 84 parts by weight of dicyandiamide (1 mol) and 292 parts of 38% formalin (3.7 mols of formaldehyde), along with 1.8 parts of borax to adjust the pH to a level above 7. Agitation was started and the temperature brought to refluxing, 95° C., and held there throughout the reaction.

For a period of approximately 30 minutes, the mixture remained water soluble by the dilution test described above. On continued heating, the condensation product became insoluble by the same test, this showing formation of the desired intermediate product. After 210 minutes heating, however, the condensation product again became infinitely dilutable in cold water. The heating was stopped and the product spray dried in an air stream of entrance temperature 180° C.

Example 2

The equipment and conditions of treatment were the same as in Example 1 except that the proportion of formalin was changed to 284 parts or 3.6 mols.

This reaction mix went through the initial stage of being soluble for about 30 minutes' heating, then water insoluble for 225 minutes, and after a very short additional period of time was soluble in water. At this stage the product was spray dried.

When a portion of the product while still in liquid form was refluxed for an additional short period, the mass gelled. The proportion of formaldehyde in this example represents the minimum sufficient to render the insoluble B-stage soluble.

Example 3

The conditions and equipment were the same as in Example 1 except that 325 parts of the formalin (4 mols) were used. After 20 minutes at 95° C., the product became water insoluble. On continued heating the material became water soluble and infinitely dilutable. The product after cooling remained water soluble overnight, after which time the product was spray dried.

Example 4

The conditions were the same as in Example 1 except that 390 parts of the formalin (5 mols) were used. The mixture was brought to 95° C. and held at this temperature for 6 hours. The condensation product passed through the initial water soluble stage, then through he insoluble stage, and became water soluble after 1½ hours. It was spray dried.

Example 5

The procedure of any one of Examples 1 to 4 is repeated except that the borax is substituted by sodium or potassium triphosphate, carbonate, or hydroxide in amount to establish the pH within the range 7 to 12 and for greater speed of condensation preferably within the range 8.5 to 12.

The product made as described, as in Examples 1-5, after drying, is a white powder. The powder is readily soluble in water. The product is stable in the dry form over long periods of time. It is stable in the form of the aqueous solutions for a sufficient time to permit use in a great variety of industrial applications as described herein.

By contrast, the method of Example 1, for instance, but with 276 parts only of 38% formalin (3.5 mols of formaldehyde to 1 mol of dicyandiamide) gives a product, after the initial water soluble stage has been passed, that becomes insoluble on dilution and gels before ever becoming water soluble at any later stage of the reaction.

In reactions as complicated as the condensation of formaldehyde with dicyandiamide, which is itself very complex in its chemical relationships, it is not possible to state with certainty the exact mechanism of the series of changes described above. On the basis of the evidence available to us, we consider that the A or initial water soluble stage represents the formation of methylol compounds with the dicyandiamide and that the B-stage represents a higher polymer, possibly with the introduction of methylene linkages as well as methylol groups.

In the conversion of this B-stage or water insoluble material to the C-stage or water soluble form, we consider that there is reaction between methylol groups of the resin and formaldehyde, to give a formal, in accordance with the mechanism by which alcohols react, through their hydroxyl groups, with aldehydes to give the class of compounds known as acetals. We consider also that the conversion to the formal contributes to the stability as well as the water solubility of the C-stage material.

This existence of the formal in the C-stage of the reaction is indicated by the properties of the C-stage product. Like acetals, it is unstable in the presence of acids. Addition of a small proportion of an acid causes conversion of the soluble C-stage material to an insoluble product. Some of the formaldehyde which was present originally in the soluble material is split out, with the formation of a high polymer resin.

It is considered also that the increase of degree of polymerization during the curing of the C-stage resin to the D-stage product is due to splitting out of formaldehyde from the formal group, with the development of methylene linkages. The methylene group is polyfunctional and acts as a bridge between the molecules in forming the higher polymers.

This curing is effected to advantage by heating or the addition of acid or by both heat and acid.

The water soluble or C-stage resin may be used as a molding powder. In this use the powder is shaped, pressed and heated in conventional equipment, as, for instance, in an injection molding machine. The curing is effected at a temperature of 120° to 200° C. The temperature is maintained until the curing is completed, to give a product that on cooling is integral and hard. It is desirable to mix the C-stage resin before the molding and curing operation with a filler such as wood flour, glass fibers, and the like.

When used as a coating or impregnating material, the C-stage water soluble product is applied to various materials or impregnated thereinto, with technique and methods that are usual in treatment of the same materials with a wide variety of other resins that are cured after their application. Then the impregnated material is cured, as, for instance, by heating or by the addition of acids, admixing of various catalysts such as electrolytes of which examples are ammonium chloride, ammonium sulfate, ammonium sulfocyanate, and ammonium hydrogen phosphate, or by using both a catalyst and an elevated temperature.

Our new resin is particularly useful in impregnating various penetrable materials shaped into sheets or other form. Examples of such materials that may be impregnated are paper, textile fabrics, leather, wood, and cork. These are examples of fibrous materials. In such use, the C-stage resin in water solution and of selected concentration is applied to the goods, either alone or in conjunction with a curing catalyst, and then is subjected to curing and evaporation of water. The catalyst added is one of those described above. The curing may be effected by heating to a temperature that is one at which the water evaporates and at which formaldehyde is liberated in substantial proportion from the C-stage resin, as, for instance, at some temperature between 120° C. and 250° C. The higher temperatures within this range may be used for a short time but in any case the temperature used must be below that of thermal weakening, in the period of exposure, of the base material which is impregnated. Preferably we use both catalyst and heat for the curing.

Advantages in the use of our C-stage resin reside in the stability of the water soluble material in dry form, the ease of dissolving it at the place and time of use in water and of application to the goods to be treated, and the quickness with which it may be cured to the D-stage resin, by heat and catalyst. The resin is low in cost of manufacture and dependable in use.

When impregnated into a woven fabric, for instance, the resin gives better crease resistance than either urea-formaldehyde or melamine-formaldehyde resins which are now being used for this purpose.

The C-stage resin is also useful as a raw material in making various alkylation product, as, for instance, ethers with aliphatic and other alcohols. In making these ethers, there is used the method which is common in the etherification of methylol-containing resins. Thus, our C-stage resin is mixed with the selected alcohol, such as methanol, ethanol, or butanol, and there is introduction of sulfuric acid in the catalytic proportion for etherification, so that the alcohol is etherified with the methylol groups of the resin. In an alternative method of making the ethers of the resin, the C-stage material is treated with sodium hydroxide and then with a dialkyl sulfate, the alkyl in the sulfate being the one which it is desired to have combined in the finished ether. The finished ethers made as described are soluble in organic solvents and are useful in the form of solutions in such solvents in surface coating and impregnating the various materials such as paper, leather, textile fabric, and the like.

It will be understood that it is intended to cover all changes and modifications of the examples of the invention herein chosen for the purpose of illustration which do not constitute departures from the spirit and scope of the invention.

What we claim is:

1. In making a water soluble resinous condensation product, the method which comprises forming a mixture of dicyandiamide and an aqueous solution of formaldehyde in the proportion of 3.6 to 5 mols of formaldehyde to 1 mol of the dicyandiamide, heating the mixture at a pH above 7 to an elevated temperature not above the temperature of boiling of the mixture at the prevailing pressure, maintaining the total free and reacted formaldehyde during the heating step in the proportion of 3.6 to 5 mols, continuing the heating until the condensation product formed becomes insoluble in water on extreme dilution and then later becomes soluble on such dilution, and then discontinuing the heating when the water soluble stage is reached.

2. The method described in claim 1 which includes drying the product remaining after discontinuing the heating, the result being a stable water soluble solid resin.

3. A water soluble condensation product of dicyandiamide and formaldehyde in the proportion of 3.6 to 5 mols of the formaldehyde to 1 mol of the dicyandiamide, the said condensation product representing the stage of condensation beyond the water insoluble intermediate condensation product, the product being made by the method of claim 1.

4. An article of manufacture comprising a fibrous sheet and a composition of the kind described in claim 3 impregnated thereinto and cured to water-insoluble condition.

5. The method of making a resin treated article which comprises dissolving the condensation product prepared as described in claim 1 in water, applying the resulting solution to a fibrous sheet, and then warming the applied solution to evaporate the water and heat-cure the said condensation product.

LUCIEN SELLET.
WILLIAM O. DAWSON.

REFERENCES CITED

The following references are of record in the file of this patent:

UNITED STATES PATENTS

| Number | Name | Date |
|---|---|---|
| 2,060,122 | Ripper | Nov. 10, 1936 |
| 2,149,672 | Frank | Mar. 7, 1939 |
| 2,321,544 | Dittmar | June 8, 1943 |
| 2,350,894 | Honel | June 6, 1944 |
| 2,377,422 | Hodgins | June 5, 1945 |
| 2,440,988 | Treboux | May 4, 1948 |